(12) United States Patent
Choksi et al.

(10) Patent No.: US 6,477,243 B1
(45) Date of Patent: Nov. 5, 2002

(54) METHOD AND APPARATUS FOR AUTOMATED FACSIMILE MESSAGE CONFIRMATION

(75) Inventors: Himanshu Choksi, Fremont, CA (US); Siva V. Kumar, Redwood City, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/069,675

(22) Filed: Apr. 29, 1998

(51) Int. Cl.[7] .............................................. H04M 11/00
(52) U.S. Cl. ........................... 379/100.06; 379/100.08; 379/93.24; 358/440
(58) Field of Search ...................... 379/100.08, 100.06, 379/100.01, 100.12, 93.24, 90.01, 88.13, 88.12, 88.17; 358/402, 405, 442

(56) References Cited

U.S. PATENT DOCUMENTS

| | | |
|---|---|---|
| 4,792,967 A | 12/1988 | Ladd et al. |
| 4,856,049 A | 8/1989 | Streck |
| 5,291,302 A * | 3/1994 | Gordon et al. ......... 379/100.06 |
| 5,459,584 A | 10/1995 | Gordon et al. |
| 5,471,522 A | 11/1995 | Sells et al. |
| 5,521,719 A | 5/1996 | Yamada |
| 5,546,447 A | 8/1996 | Skarbo et al. |
| 5,579,126 A | 11/1996 | Otsuka |
| 5,675,507 A | 10/1997 | Bobo, II |
| 5,790,639 A * | 8/1998 | Ranalli et al. ......... 379/100.08 |
| 5,822,409 A | 10/1998 | Chang et al. |
| 5,838,461 A | 11/1998 | Hsieh |
| 5,841,550 A * | 11/1998 | Johnson ................. 379/100.06 |
| 5,870,549 A | 2/1999 | Bobo, II |
| 5,907,604 A | 5/1999 | Hsu |
| 5,917,615 A | 6/1999 | Reifman et al. |
| 5,956,390 A * | 9/1999 | McKibben et al. .... 379/100.06 |
| 5,978,806 A | 11/1999 | Lund |
| 5,991,290 A | 11/1999 | Malik |
| 6,025,931 A * | 2/2000 | Bloomfield ................. 358/442 |
| 6,067,546 A | 5/2000 | Lund |
| 6,073,165 A | 6/2000 | Narasimhan et al. |
| 6,104,789 A * | 8/2000 | Lund ........................ 379/93.24 |

FOREIGN PATENT DOCUMENTS

| | | |
|---|---|---|
| EP | 798 899 A1 | 3/1997 |
| EP | 835 011 A1 | 3/1997 |
| EP | 812 100 A2 | 6/1997 |
| EP | 0 835 011 A1 | 4/1998 |
| FR | 2 705 180 | 11/1994 |
| FR | 2748 178 A1 | 4/1996 |
| WO | WO92/12591 | 7/1992 |
| WO | WO96/34341 | 10/1996 |

OTHER PUBLICATIONS

International Search Report for PCT/US 99/06173, dated Jul. 16, 1999.

* cited by examiner

*Primary Examiner*—Stella Woo
(74) *Attorney, Agent, or Firm*—Blakely, Sokoloff, Taylor & Zafman LLP

(57) ABSTRACT

Integration of telecommunication message services and other communication services is achieved by notifying a user of a communication system of successful receipt of a message (e.g., a facsimile message) by sending a confirmation message to the user, e.g., using e-mail, facsimile, voice and/or data communications. The user may be identified by a unique identifier, e.g., a telephone number. The confirmation message may comprise a facsimile message, an attachment which includes the received message or a computer network address of a location where information regarding the received message and/or the message itself may be accessed. For the latter case, the computer network address is preferably a universal resource locator (URL) associated with a web page at which the information and/or received message may be accessed. The information may allow the user to view the message (e.g., as marked up by the intended recipient thereof), and/or it may indicate whether the intended recipient has read, reviewed, down-loaded to a hard copy or other device or otherwise accessed the message.

73 Claims, 4 Drawing Sheets

| Facsimile Transmission Identifier | Communication Address |
|---|---|
| ⋮ | ⋮ |
| (123)555-1234 | user@host.com |
| ⋮ | ⋮ |

32 — (123)555-1234   34 — user@host.com   30

Facsimile Transmission Identifier = ANI, etc.
Communication Address = e-mail address, telephone, cellular, pager number / account / address, etc.

*FIG.2*

METHOD AND APPARATUS FOR AUTOMATED FACSIMILE MESSAGE CONFIRMATION

FIELD OF THE INVENTION

The present invention relates to the integration of computer networks and telecommunication services and, more particularly, to the provision of facsimile services, and especially automatic confirmation of the receipt of a facsimile message by the intended recipient thereof, within a computer network.

BACKGROUND

With the present commercialization of a computer network of networks, commonly referred to as the internet, a variety of businesses have started to offer electronic mail (e-mail) and other services for computer users. In general, e-mail provides a rapid and relatively inexpensive means of communications between computer users. In some sectors, e-mail communication is rapidly replacing traditional telephone and facsimile communication. Within some computer networks, users who transmit e-mail messages can determine whether those messages have been transmitted to their intended recipient and even, in some cases (e.g., within local area networks), when those messages have been read.

One problem with e-mail communications, however, is that relatively large files may not be easy to share between users. For example, large files are often included as attachments to e-mail messages. These attachments, if they exceed a certain size, may be stripped off by e-mail gateways, e.g., located at the front-end of a computer network system, before the message is passed to its ultimate destination. As a result, the ultimate recipient may not receive the intended message.

Another problem with e-mail messages transmitted via the internet is that important formatting information may be lost during transmission. For example, tabular data may be reorganized during transmission such that the recipient must reorganize the data into its proper tabular form before the message can be clearly understood. So too, graphic information may be lost and/or distorted during transmission.

Traditional facsimile messages avoid these problems. For example, facsimile messages transmitted across telephone lines retain all the formatting and graphical information of the original message. Also, there is no danger of portions of a facsimile message being stripped off by a gateway prior to reception. Despite these advantages, however, facsimile reception usually requires a dedicated telephone line for connection to the receiving facsimile machine. In a large corporation or other office, it is impractical to provide each member of the office with dedicated facsimile reception capabilities, thus, facsimile services are shared amongst a number of users. This poses a problem where confidential information is to be received by facsimile. There can be no guarantee that the intended recipient of the facsimile message will be the only one who will observe the confidential facsimile message.

Like some e-mail systems, some means exist for a facsimile user to determine whether a facsimile message was transmitted and, in some cases, for receiving an automatic confirmation of a successful reception of the message. For example, U.S. Pat. No. 5,377,017 describes a method and apparatus which allows for confirmation of facsimile message reception and transmission quality wherein a series of signals between source and add destination station, both having confirming modes, ensures the appropriate confirmation of facsimile transmission.

Thus, although some means for providing confirmation of facsimile message reception exist, these means tend to require that specialized facsimile machines (or upgrade kits) be employed at both the sending and receiving ends. Also, although some vendors do offer partial integration of facsimile services and e-mail services, in these systems users must each be assigned individual telephone numbers, thus leading to difficulties where a large number of users must be accommodated. Thus, it would be desirable to provide a system which combines the advantages, while avoiding the disadvantages, of facsimile message confirmation and e-mail communication systems within a single system.

SUMMARY OF INVENTION

The present invention provides, in one embodiment, a method which includes automatically transmitting a confirmation message to a first user of a computer-based facsimile station, upon receipt of an indication that a first facsimile message transmitted by the first user has been accessed by an intended recipient thereof. The confirmation message may be a second facsimile message (e.g., a predetermined message or a copy of a cover sheet or first page associated with the first facsimile message with a confirmation indication superimposed thereon). The indication that the first facsimile message has been accessed by the intended recipient may be provided by the intended recipient accessing a web page (or other computer storage location) where the first facsimile message (or, in some cases, an image thereof) has been stored. To allow for the automatic confirmation provided by the present invention, during receipt of the first facsimile message, the facsimile station identifies the source thereof, for example, through an automatic number identification (ANI) field provided as part of the transmission of the first facsimile message. The source identification information is stored at the facsimile station and may be later used to dial up the source of the first facsimile message so that the confirmation message may be transmitted thereto.

In further embodiments, the present invention provides a method which includes automatically transmitting a confirmation message to a first user of a computer-based facsimile reception station, upon transmission of a notification message that a first facsimile message transmitted by the first user has been received for an intended recipient thereof. The confirmation message may be a second facsimile message (e.g., a predetermined message or a copy of a cover sheet or first page associated with the first facsimile message with a confirmation indication superimposed thereon). The intended recipient may share a single telephone number with a plurality of facsimile users and may be uniquely identified by a unique identifier appended to the shared telephone number.

In such embodiments, the identification of the source of the first facsimile message may be accomplished using identification data (e.g., an ANI) provided with the first facsimile message. This identification data may later be used to transmit the confirmation message. For example, the identification data may indicate a telephone number where a confirmation facsimile message may be directed. Alternatively, the identification data may be used to access a database to locate another communication address associated with the source of the first facsimile message. This may be accomplished, for example, using a look-up table which associates the identification data with a corresponding communication addresses of the source of the first facsimile message (e.g., an e-mail, telephone, cellular telephone, voicemail box and/or pager number or address). The first user may thus be notified that the first facsimile message has been successfully received by the facsimile reception station by the transmission of a confirmation message to the appropriate communication device at the first user's associated communication address. The confirmation message may comprise a second facsimile message or another message (e.g., a voice or data message) which indicates the successful reception.

In another embodiment, the present invention provides a computer which includes receiver circuitry for receiving a facsimile message destined for an intended recipient.

Coupled to the receiver circuitry is an identification unit which is configured to associate identification information with the facsimile message, the identification information indicating the source of the facsimile message. A notification unit is configured to transmit a confirmation message to a communication address associated with the source of the facsimile message, for example, upon receipt of the facsimile message by its intended recipient. The confirmation message may be in the form of any voice and/or data message. For example, the confirmation message may be an alphanumeric message transmitted via e-mail or to a pager and may comprise a receipt confirmation (e.g., "Fax received." or a similar message), a facsimile message itself, a voice message delivered to a telephone, and/or a message indicating a computer network address (e.g., a URL) which identifies or specifies a location (e.g., a web page) at which a user associated with the source of the facsimile message may inquire as to whether the intended recipient thereof has reviewed the facsimile message. The URL may identify a web page associated with the computer or a web page associated with some other storage device. In general, the identification unit of the computer comprises a mapping function configured to receive the identification information and to provide therefrom a communication address associated with the source of the facsimile message. The mapping function may be embodied in a look-up table stored in the computer (e.g., in volatile or non-volatile memory) or it may comprise a storage device wherein automatic number identification data associated with the facsimile message (e.g. received as part of the same transmission) is retained for later use. The notification unit may be configured to transmit the confirmation message to the communication address provided by the mapping function. The computer may also include a storage archive for received facsimile messages.

In still another embodiment, the present invention provides a shared facsimile message reception system which includes a computer configured to receive, from a single telephone connection, a plurality of facsimile messages, each destined for different users of the system. The computer may also be configured to provide confirmation of such reception and/or confirmation of the receipt of the facsimile message by the intended recipients thereof. In general, confirmation of a particular received facsimile message is provided by way of a confirmation message transmitted to a communication address (e.g., as a voice, data and/or e-mail message) associated with the source thereof. The confirmation message may comprise a computer network address (e.g., a URL) of a web page where a user associated with the source of the facsimile message may determine whether the intended recipient of the facsimile message has reviewed the message.

In yet another embodiment, a subscriber-based facsimile message reception system includes a facsimile reception station configured to receive, across a single telephone connection, facsimile messages for a number of subscribers and to confirm successful reception of the facsimile messages by the intended recipients thereof. The system may also include an interface for coupling the facsimile message reception station to a computer network, e.g., the internet. In general, the facsimile message reception station is configured to determine a communication address (or addresses) for the source of a particular facsimile message in response to an indication that the intended recipient of that particular facsimile message has been notified of the receipt of the message and/or has actually received the message. Such indication may be provided by the intended recipient accessing a web page at which the facsimile message may be viewed and/or down-loaded.

These and other features and advantages of the present invention will be apparent from a review of the detail description and its accompanying drawings which follow.

BRIEF DESCRIPTION OF THE DRAWINGS

The present invention is illustrated by way of example, and not limitation, in the figures of the accompanying drawings in which:

FIG. 2 illustrates a look-up table which may be used to implement a mapping function for the computer illustrated in FIG. 3;

DETAILED DESCRIPTION

Described herein is a shared facsimile message system which generally employs a computer network, e.g., the internet. The system is one exemplary embodiment of the present invention. The system achieves the integration of facsimile services and other communication services, for example by automatically confirming the receipt of a facsimile message from a user thereof through a confirmation message transmitted to a communication address associated with the source of the facsimile message. 81. The source of the facsimile message may be the facsimile machine which transmitted the facsimile message or the actual sender of the message. The confirmation message may be transmitted via facsimile or e-mail (e.g., as a message indicating receipt of the facsimile message), or it may comprise a voice and/or data message transmitted to a telephone, cellular, voicemail box and/or pager number or address associated with the source of the facsimile message. Shown in FIG. 1 is one example of such a system, however, other configurations of the present invention are possible, as will be evident from the following discussion.

Figure 1:
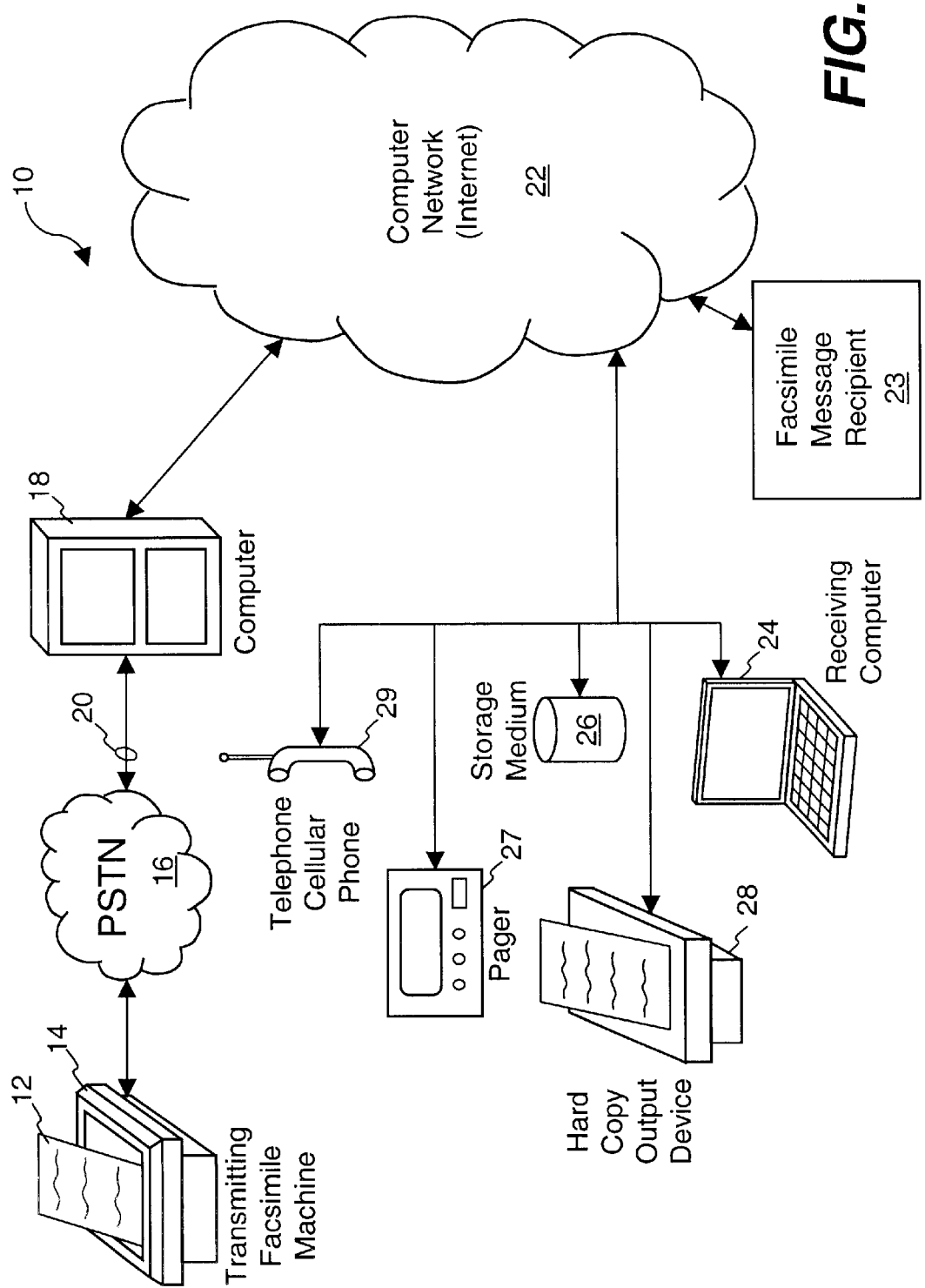
FIG. 1 illustrates a facsimile message system configured in accordance with an embodiment of the present invention.

Facsimile message system 10 of FIG. 1 integrates traditional facsimile transmission and reception means with other conventional communication transmission and reception means and may make use of the computer network of networks generally referred to as the internet. The operation of facsimile message system 10 may be described briefly as follows. A facsimile message 12 is transmitted from a transmitting facsimile machine 14 across the public switched telephone network (PSTN) 16 to a computer 18 where the facsimile message 12 is received. Computer 18 may provide storage and forwarding services for a number of subscribers of facsimile message system 10 and may further allow the use of a single connection 20 from PSTN 16 to be shared amongst a large number of subscribers or users. Multiple such connections 20 may be provided as needed to accommodate even more users.

Upon receipt of a facsimile message 12, computer 18 forwards a notification message which indicates such reception to the intended recipient 23. The notification message may be transmitted to a communication device or address such as an e-mail address (e.g., associated with a subscriber e-mail account), a telephone, cellular or pager number or address, or even combinations of these devices and/or addresses. The notification message may be an alpha-numeric message (e.g., as may be provided to an e-mail or pager address) and/or a voice message (e.g., as may be transmitted to a telephone, cellular or voicemail box address.

The notification message may be transmitted across a computer network 22 (e.g., the internet) to the user. Even in the case of a voice message notification message, the internet may be employed, e.g., thus allowing for reduced telephone access charges where the call to the communication address of the intended recipient of the facsimile message from computer 18 may otherwise be a long distance or other toll call. Software and other applications which allow for the packaging and transmission of such voice messages across the internet (or other computer network 22) are known in the art and need not be discussed further herein.

Upon receipt of the notification message, the intended recipient 23 of the facsimile message 12 received by computer 18 may access and/or down-load the message. The techniques for providing such capabilities and the manner in which computer 18 may be configured to provide such services for multiple users sharing a single telephone connection 20 to PSTN 16 (i.e., a single telephone number), are described in co-pending Application No. 09/066,268, entitled "Computer Implemented Method and Apparatus for Receiving Facsimile Messages Using an Identifier Appended to a Shared Telephone Number", filed Apr. 24, 1998, by Siva V. Kumar et al., the complete disclosure of which is incorporated herein by reference.

Stated briefly, upon receipt of the notification message, the intended recipient of the facsimile message may choose to have the message down-loaded to a receiving computer and/or a storage medium associated therewith and/or a hard copy output device (e.g., a facsimile machine or printer). In other cases, the facsimile message may be down-loaded in the form of an alpha-numeric message to a pager, or the notification message may be the only message provide to pager. In still other cases, the facsimile message may be down-loaded as a voice message (e.g., a computer-synthesized voice message) to telephone/cellular telephone. More often, however, it is envisioned that the notification message transmitted to the intended recipient will comprise a computer network address (e.g., a URL associated with a web page) of a location where the received facsimile message 12 may be accessed. The received facsimile message may be accessed by allowing the user to view the message, or it may be accessed by allowing the user to down-load the message in one of a number of forms.

Upon transmission of the notification message, the user (i.e., associated with the transmitting facsimile machine 14) may receive a confirmation message indicating that facsimile message 12 was successfully received by computer 18 and that the intended recipient of the message has been notified thereof. Alternatively, or in addition, the user may receive such a confirmation message after the intended recipient has actually read, reviewed or otherwise accessed or received the facsimile message (e.g., by accessing a web site at which the message is available for review as described in the above-identified co-pending application). In still further embodiments, the intended recipient of the facsimile message may choose to have a confirmation message transmitted to the user. For example, if after the intended recipient has accessed the facsimile message by visiting a web page as discussed above, the user may notify computer 18 (or another server where the web page is stored) of successful reception of the facsimile message and request that a confirmation message be transmitted to the user. This may be accomplished by specifying a communication address (e.g., an e-mail, pager, telephone, etc. address or number) that the confirmation address should be transmitted to, for example, by submitting a web form including the communication address, or in some embodiments by simply having the intended recipient transmit an electronic message (e.g., by clicking on a "send confirmation" button displayed on the web page, instructing computer 18 to send the confirmation message. Thus, computer 18 may be configured to extract the submitted communication address from a submitted web form and forward a confirmation message to the user thereat or, alternatively, to automatically identify the communication address of the user (as described above) and transmit the communication message to that address.

In any event, the confirmation message may be down-loaded to a receiving computer 24, a storage medium 26, or a hard copy output device (e.g., a facsimile machine or printer) 28 and/or a combination of these devices. Storage medium 26 may, for example, be included within the receiving computer 24. In such a case, storage medium 26 may comprise a hard disk drive or a floppy disk. In some cases, storage medium 26 will be read/write memory associated with receiving computer 24. In other cases, after being received by computer 24, the message may be down-loaded to hard copy output device 28. In other cases, the confirmation message may be down-loaded in the form of an alphanumeric message to pager 27 (e.g., a "Fax sent." or "Fax received." message). In still other cases (or even concurrently with above-described methods), the confirmation message may be down-loaded as a voice message (e.g., a computer-synthesized voice message) to telephone/cellular telephone 29. Further, in those cases where computer 18 is not provided with a confirmation message communication address for the user, the confirmation message may take the form of a facsimile message transmitted from computer 18 to facsimile machine 14 via PSTN 16. To accomplish the transmission of the confirmation message, computer 18 receives and stores a facsimile transmission identifier (e.g., an automatic number identifier (ANI) or some user input) associated with facsimile machine 14 (the source of the facsimile message 12) during the time facsimile message 12 is being transmitted. Later, for example after receipt of facsimile message 12, the facsimile transmission identifier may be used to determine the communication address to which the confirmation message is to be sent (as described further below).

The confirmation message transmitted to the user may comprise a simple "fax received" message, a facsimile message (e.g., a confirmation copy of at least a portion of facsimile message 12), or a computer network address of a location where the user may determine the status of facsimile message 12 (e.g., when/if the message was successfully received by computer 18, when/if a notification message to the intended recipient of the message was/has been sent, when/if the intended recipient has accessed the message) by accessing information associated therewith. For the latter case, the computer network address is preferably a URL associated with a web page which the user may access. The web page may allow the user to enter a message identifier (e.g., the telephone number of the transmitting facsimile machine 14) and thereby access the records or other information regarding the received facsimile message 12 and/or even the message itself (e.g., to view later mark-ups added by the intended recipient or others or to add such mark-ups).

As indicated, upon receipt of the facsimile message 12, and/or upon receipt of an indication that the intended recipient thereof has reviewed the message, computer 18 provides confirmation thereof to the user (i.e., the source of facsimile message 12). In general, the facsimile transmission identifier associated with facsimile message 12 (e.g., the ANI of facsimile machine 14) is mapped to a communication address of the user (e.g., an e-mail, telephone, cellular, pager, facsimile or other communication address or number), as stored at computer 18, and a confirmation message is transmitted to that address. If no such communication address is found at computer 18, then a return facsimile confirmation message may be transmitted to facsimile machine 14, for example, by having computer 18 automatically place a call to the ANI received with facsimile message 12. The confirmation message may comprise a computer network address (e.g., a URL) indicating where information regarding the facsimile message 12 may be accessed. Upon receipt of the confirmation message, and depending on its format, the user may visit the web site indicated by the URL or other computer network address transmitted as part of the confirmation message to determine whether the intended recipient of the message has read, reviewed, or otherwise accessed the message. For example, in addition to the stored message itself, the web site may provide information regarding the time of receipt of the message, the identity of the source of the message and/or the identity and/or relevant access times of others who may have viewed the message. Preferably, such information, including the facsimile message itself, may only be retrieved upon submission of a recognized authorization code or password.

As shown in FIG. 2, mapping the facsimile transmission identifiers to associated communication addresses of the facsimile users may be accomplished, for example, using a look-up table 30 (e.g., stored as a data structure in memory at computer 18 and accessible using parsing techniques common in the art) which associates each of the identifiers 32 with a corresponding one of a number of communication addresses 34 of the facsimile users. The facsimile users may then be notified of a successfully received facsimile message by the transmission of a confirmation message to the appropriate facsimile user at the user's associated communication address. As indicated above, the confirmation message may comprise a message indicating receipt of the facsimile message, (e.g., "Fax received."), a confirmed copy of at least a portion of the received facsimile message itself, or it may comprise an attachment which includes at least a portion of the received facsimile message. Preferably, however, the confirmation message comprises a computer network address (e.g., a URL) specifying a location (e.g., a web page) at which information regarding the received facsimile message may be accessed.

Computer 18 thus may include receiving circuitry for receiving a number of facsimile messages 12, each destined for a different recipient. Coupled to the receiving circuitry is an identification unit (described above as a mapping function, e.g., look up table 30) which is configured to associate each received facsimile message with an appropriate communication address of the sender thereof. A notification unit within computer 18 may be configured to transmit a confirmation message to the appropriate user upon successful receipt of a facsimile message and/or the confirmation message may be sent when the intended recipient of the facsimile message access the message. In one embodiment, the confirmation message is transmitted via e-mail and may comprise a confirmed copy of at least a portion of the facsimile message itself, an e-mail attachment (e.g., which includes at least a portion of the facsimile message), or a computer network address (e.g., a URL) which identifies or specifies a location (e.g., a web page) at which information regarding the received facsimile message, and/or the message itself, may be accessed. In other cases though, the confirmation message may be a voice and/or data message transmitted to a facsimile machine or other hard copy output device 28, telephone 29 and/or pager 27. Computer 18 may also include a storage archive for received facsimile messages and the confirmation message may comprise an address of the storage archive at which a particular stored facsimile message, and/or information regarding that message, may be accessed.

Figure 3:
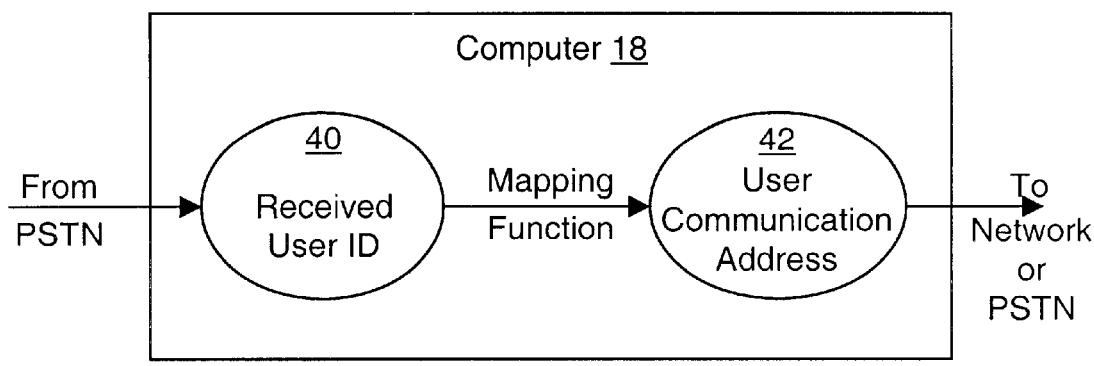
FIG. 3 illustrates one embodiment of a mapping function provided by a computer associated with the facsimile message system of FIG. 1.

FIG. 3 illustrates the mapping function provided by computer 18. In general, the user ID 40 (e.g., an ANI of the transmitting facsimile machine) is received from PSTN 16 and mapped to an associated user communication address 42. The user communication address 42 allows a confirmation message to be transmitted to the source of the facsimile message, for example, via computer network 22 and/or PSTN 16.

Figure 4:
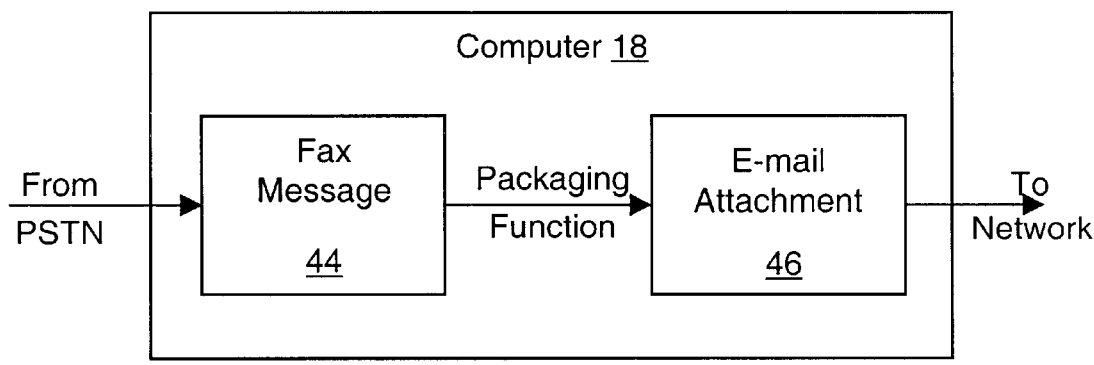
FIGS. 4 illustrates a packaging function provided by a computer associated with the facsimile message system of FIG. 1.

FIG. 4 shows a packaging function which may be provided at computer 18. In this case, the received facsimile message 44 (or a portion thereof) from PSTN 16 is packaged as an e-mail attachment 46 prior to transmission to a user across computer network 22. In some cases, instead of an e-mail attachment, the fax message 44 may be directly included within the confirmation message itself. Alternatively, the confirmation message may be a voice message transmitted to a telephone, cellular and/or voice-mail box address or number.

Figure 5:
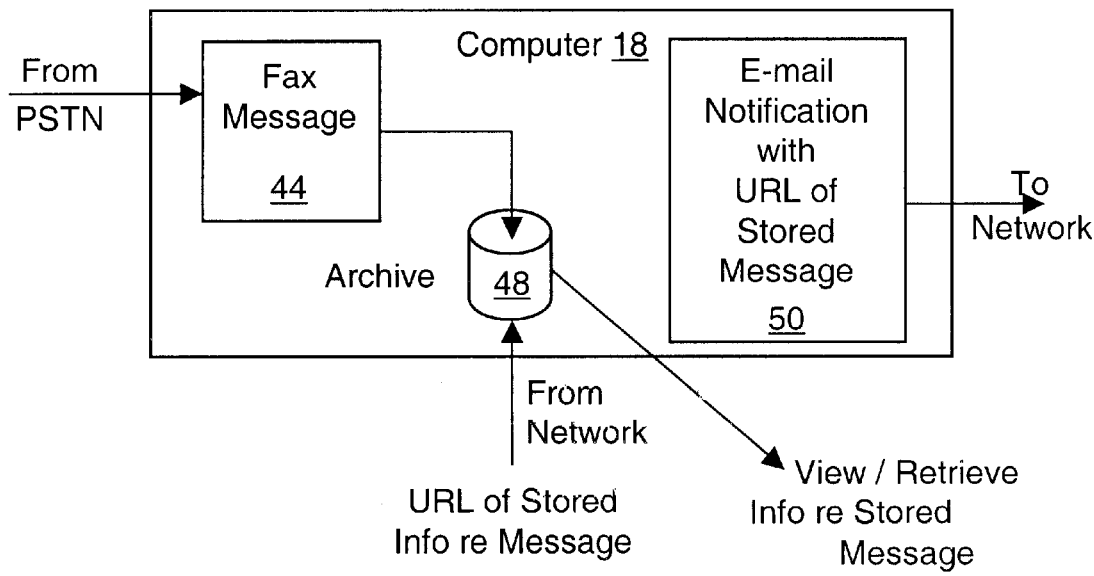
FIG. 5 illustrates a storage and notification function provided by a computer associated with the facsimile message system of FIG. 1.

FIG. 5 shows one exemplary operation of computer 18 when information regarding the received facsimile message 44 is stored in an archive 48, e.g., a hard disk drive or other storage device. Upon receipt of the facsimile message 44, an e-mail or other confirmation message 50, including the URL of a web page at which the stored facsimile message 44 may be accessed, is transmitted to the user, e.g., via computer network 22 or PSTN 16. Upon receipt of the confirmation message 50, the user may access the information regarding the stored facsimile message 44 (and/or the message itself) by visiting the web page associated with the URL provided in the confirmation message. In general, that URL will correspond to a storage location within archive 48. In some cases, however, storage archive 48 may be located separate from computer 18. Upon accessing the web page, e.g., using a personal identification number, information regarding the facsimile message and/or the message itself (possibly as marked up by the intended recipient of the message) may be viewed and/or otherwise retrieved by the user.

Figure 6:
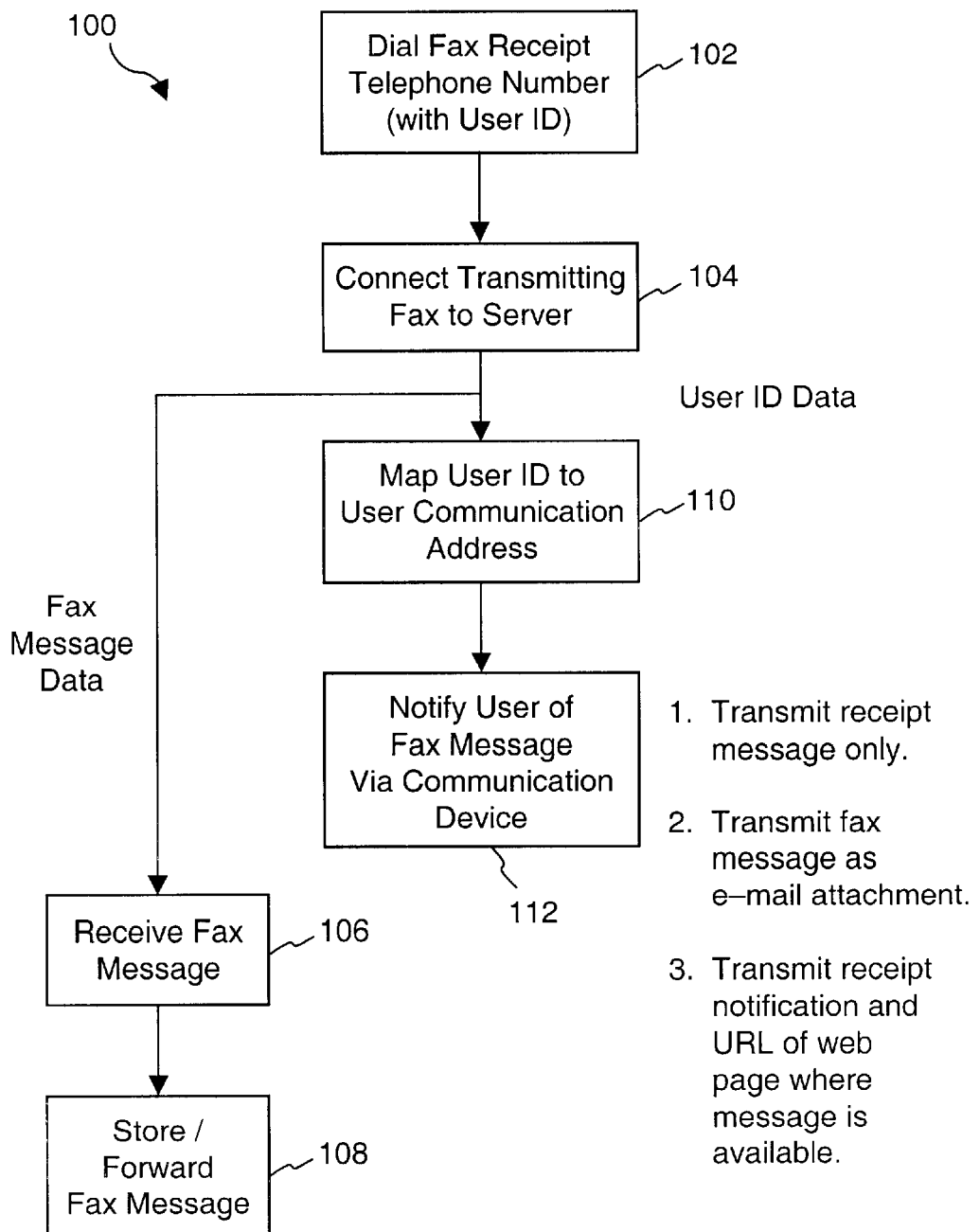
FIG. 6 is a flow diagram presenting one method of confirming a facsimile message reception according to one embodiment of the present invention.

FIG. 6 illustrates a process 100 for using a facsimile message reception system in accordance with one embodiment of the present invention. At step 102, a transmitting facsimile machine dials up the shared facsimile receipt telephone number and provides the facsimile transmission identifier (e.g., an ANI) associated with the source of the facsimile message. At step 104, the transmitting facsimile machine is connected to a computer which provides the store and forward services discussed above. As indicated, this connection may be provided by the public switched telephone network or by a private telecommunications network.

Once the connection has been established, facsimile message data may be received by the computer at step 106. The received facsimile message may be stored and reformatted (e.g., as an image stored at a web page accessible by a browser application or other software package) at step 108 in accordance with the procedure discussed in the above-identified co-pending application.

User identification data which is also transmitted by the transmitting facsimile machine is received at the computer and, at step 110, is mapped to the associated user communication address. The user communication address is used, at step 112, to notify the user of the receipt of the facsimile message, e.g., by e-mail or one or more of the other above-identified means. As indicated, the confirmation message may indicate the receipt of the message only, in which case the user may have to ensure the intended recipient received the facsimile message, or the confirmation message may indicate that the intended recipient of the facsimile message has received or otherwise accessed it.

Thus, an automated facsimile message system has been described. Although the present invention has been discussed with reference to specific illustrated embodiments thereof, the generality of the present invention should in no way be limited thereby. For example, in addition to the above-described embodiments, a subscriber-based telecommunications message (e.g., voice or data) system configured in accordance with the present invention may include a message reception station configured to receive voice and/or data messages for a number of subscribers and to notify each sender thereof of the successful receipt and or review of a message. The system may also include an interface for coupling the message reception station to a computer network, e.g., the internet. In general, the message reception station may include a mapping function (e.g., as embodied in a look-up table) configured to provide a communication address for one of the system users in response to a indication that a message transmitted by that user has been received and/or reviewed. Such indication may be provided by an unique identifier associated with the user. The unique identifier may be received automatically (e.g., as an ANI) or as additional user input and, preferably, comprises a series of digits such as a telephone number associated with the message source. To preserve this generality then, the present invention should only be measured in terms of the claims which follow.

What is claimed is:

1. A method, comprising automatically transmitting a confirmation message via e-mail to a user of a computer-based facsimile reception station upon notification that a facsimile message transmitted by the user has been received by an intended recipient thereof, said notification representing recognition that a web page at which the facsimile message is available for viewing has been accessed by the intended recipient of the facsimile message, wherein the confirmation message includes a computer network address of a location at which information associated with the facsimile message can be accessed.

2. The method of claim 1 wherein a source of the facsimile message received at the facsimile reception station is identified by mapping a unique identifier associated therewith to an associated communication address of the source of the facsimile message.

3. The method of claim 2 wherein the mapping is accomplished using a lookup table.

4. The method of claim 2 wherein the communication address comprises an e-mail address.

5. The method of claim 2 wherein the communication address comprises a telephone number.

6. The method of claim 2 wherein the communication address comprises a cellular telephone number.

7. The method of claim 2 wherein the communication address comprises a pager account number.

8. The method of claim 1 wherein the confirmation message comprises at least a portion of the received facsimile message.

9. The method of claim 1 wherein the confirmation message comprises a computer network address specifying a location at which information regarding the received facsimile message may be accessed.

10. The method of claim 1 wherein the confirmation message comprises a computer network address specifying a location at which information regarding the received facsimile message may be accessed.

11. The method of claim 10 wherein the computer network address comprises a universal resource locator (URL).

12. The method of claim 1 wherein the confirmation message comprises a voice message.

13. The method of claim 1 wherein the confirmation message comprises an alpha-numeric message.

14. The method of claim 1 further comprising accessing information regarding the received facsimile message after receipt of the confirmation message.

15. The method of claim 14 wherein accessing the information regarding the received facsimile message included viewing the received facsimile message.

16. The method of claim 1 wherein the notification of receipt of the facsimile message by the intended recipient thereof comprises receipt of a web form including a communication address of the user.

17. A computer, comprising:
    receiving circuitry for receiving a number of facsimile messages across a single telephone connection, each facsimile message destined for a different recipient;
    an identification unit coupled to the receiving circuitry and configured to associate each received facsimile message with an appropriate source thereof, said identification unit comprising a mapping function configured to receive a unique identifier associated with the source of a first facsimile message and to provide therefrom a communication address of the source of the first facsimile message; and
    a notification unit configured to transmit a confirmation message by one or more methodologies including via e-mail to an appropriate one of the sources of the facsimile messages upon receipt of an indication that the first of the facsimile messages transmitted thereby has been accessed by an intended recipient of the first facsimile message.

18. The computer of claim 17 wherein the confirmation message is transmitted to a telephone number.

19. The computer of claim 17 wherein the confirmation message is transmitted to a cellular telephone number.

20. The computer of claim 17 wherein the confirmation message is transmitted to a pager number.

21. The computer of claim 17 wherein the confirmation message is transmitted as a voice message.

22. The computer of claim 17 wherein the confirmation message is transmitted as an alpha-numeric message.

23. The computer of claim 17 wherein the confirmation message is transmitted as a facsimile message.

24. The computer of claim 17 wherein the confirmation message comprises a confirmed copy of the first facsimile message.

25. The computer of claim 17 wherein the confirmation message comprises a computer network address specifying a location at which information regarding the first facsimile message may be accessed.

26. The computer of claim 25 wherein the computer network address comprises a universal resource locator (URL).

27. The computer of claim 26 wherein the URL identifies a web page associated with the computer.

28. The computer of claim 17 wherein the mapping function is embodied in a lookup table.

29. The computer of claim 17 wherein the notification unit is configured to transmit the confirmation message to the communication address provided by the mapping function.

30. The computer of claim 29 wherein the communication address comprises an e-mail address.

31. The computer of claim 29 further comprising a storage archive for the received facsimile messages and wherein the confirmation message comprises an address of the storage archive at which information regarding stored facsimile messages may be accessed.

32. A shared facsimile reception system, comprising:
  a computer configured to receive, from a single telephone connection, a plurality of facsimile messages, each destined for a different one of a number of users of the shared facsimile reception system and further configured to provide a confirmation message of a reception by a user to the sources of the facsimile messages by one or more methodologies including via e-mall, wherein such confirmation message is transmitted by one or more methodologies including via e-mail and comprises a computer network address of a storage location associated with at least a first facsimile message and comprising at least the first facsimile message.

33. The shared facsimile reception system of claim 32 wherein the confirmation message is transmitted as a telephone call.

34. The shared facsimile reception system of claim 32 wherein the confirmation message is transmitted as a cellular telephone call.

35. The shared facsimile reception system of claim 32 wherein the confirmation message is transmitted as a voice message.

36. The share d facsimile reception system of claim 32 wherein the confirmation message is transmitted as an alpha-numeric message.

37. The shared facsimile reception system of claim 32 wherein the confirmation message is transmitted to a pager.

38. The shared facsimile reception system of claim 32 wherein the computer network address comprises a universal resource locator (URL).

39. A subscriber-based facsimile reception system, comprising a facsimile reception station configured to receive facsimile messages for a number of subscribers from a single telephone connection and to confirm, through one or more methodologies including email, successful reception by intended recipients thereof by way of a confirmation message to a sender of each of said facsimile messages, each confirmation message including a computer network address at which information associated with the facsimile message can be accessed.

40. The subscriber-based facsimile reception system of claim 39 wherein the facsimile reception station is further configured to notify each source of the facsimile messages upon successful receipt of the facsimile messages transmitted thereby.

41. The subscriber-based facsimile reception system of claim 39 wherein the facsimile reception station is further configured to confirm successful reception by way of a confirmation message transmitted as a telephone call.

42. The subscriber-based facsimile reception system of claim 39 wherein the facsimile reception station is further configured to confirms successful reception by way of a confirmation message transmitted as a cellular telephone call.

43. The subscriber-based facsimile reception station of claim 39 wherein the facsimile reception station is further configured to confirm successful reception by way of a confirmation message transmitted as an additional facsimile message.

44. The subscriber-based facsimile reception system of claim 39 wherein the facsimile reception station is further configured to confirm successful reception by way of a confirmation message transmitted as a voice message.

45. The subscriber-based facsimile reception system of claim 39 wherein the facsimile reception station is further configured to confirm successful reception by way of a confirmation message transmitted as an alpha-numeric message.

46. The subscriber-based facsimile reception system of claim 39 wherein the facsimile reception station is further configured to confirm successful reception by way of a confirmation message transmitted to a pager.

47. The shared facsimile reception system of claim 39 wherein the computer network address comprises a universal resource locator (URL).

48. The subscriber-based facsimile reception system of claim 39 wherein the facsimile reception station comprises a mapping function to provide a communication address of a first of the sources of the received facsimile messages in response to an indication that a facsimile message associated with the first source has been received.

49. The subscriber-based facsimile reception system of claim 48 wherein the communication address comprises an e-mail address.

50. The subscriber-based facsimile reception system of claim 48 wherein the communication address comprises a telephone number.

51. The subscriber-based facsimile reception system of claim 48 wherein the communication address comprises a cellular telephone number.

52. The subscriber-based facsimile reception system of claim 48 wherein the communication address comprises a pager number.

53. The subscriber-based facsimile reception system of claim 48 wherein the indication that a facsimile message associated with the first source has been received comprises an access of a web page at which the facsimile message associated with the first source is available.

54. The subscriber-based facsimile reception system of claim 48 wherein the first of the sources is notified of successful reception of the facsimile message associated therewith by transmitting from the facsimile reception station a confirmation message comprising a universal resource locator (URL) identifying a web page at which information regarding the facsimile message associated with the first source may be accessed.

55. The subscriber-based facsimile reception system of claim 54 wherein the web page is associated with the facsimile reception station.

56. A method comprising:
  determining that a facsimile message has been successfully received by an intended recipient of the facsimile message; and
  notifying a sender of the facsimile message that the facsimile message has been successfully received, by sending a confirmation message to the sender at a communication address associated with a source of the facsimile message, including transmitting the confirmation message via e-mail, wherein the confirmation message includes a computer network address of a location at which information associated with the facsimile message can be accessed.

57. The method of claim 56 wherein the confirmation message is sent to the user as a voice message.

58. The method of claim 56 wherein the confirmation message is sent to the user as an alpha-numeric message.

59. The method of claim 56 wherein the confirmation message is sent to the user via telephone.

60. The method of claim 56 wherein the confirmation message is sent to the user via cellular telephone.

61. The method of claim 56 wherein the confirmation message is sent to the user via pager.

62. The method of claim 56 wherein the confirmation message comprises at least a portion of the facsimile message.

63. The method of claim 56 wherein the computer network address comprises a universal resource locator (URL).

64. The method of claim 63 wherein the information associated with the facsimile message includes the facsimile message.

65. The method of claim 56 wherein the confirmation message comprises a confirmed copy of the facsimile message.

66. A method comprising:
  determining that a facsimile message has been successfully received by an intended recipient of the facsimile message; and
  notifying a sender of the facsimile message that the facsimile message has been successfully received by the intended recipient, by sending a confirmation message to the sender at a communication address associated with a source of the facsimile message, wherein the communication address is specified by the intended recipient of the facsimile message.

67. The method of claim 66 wherein the confirmation message includes a computer network address of a location at which information associated with the facsimile message can be accessed.

68. The method of claim 66 wherein the information associated with the facsimile message includes modifications to the facsimile message added by the intended recipient.

69. The method of claim 66, wherein said sending the confirmation message comprises transmitting the confirmation message via e-mail.

70. A method comprising:
  determining that a facsimile message has been successfully received by an intended recipient of the facsimile message; and
  notifying a sender of the facsimile message that the facsimile message has been successfully received by the intended recipient, by sending a confirmation message to the sender at a communication address associated with a source of the facsimile message, wherein said notifying includes automatically determining the communication address in response to an indication by the intended recipient that the confirmation message is to be sent.

71. The method of claim 70, wherein the confirmation message includes a computer network address of a location at which information associated with the facsimile message can be accessed.

72. The method of claim 70, wherein the indication by the intended recipient that the confirmation message is to be sent comprises an electronic message from the intended recipient.

73. The method of claim 70, wherein said sending the confirmation message comprises transmitting the confirmation message via e-mail.

\* \* \* \* \*